Oct. 26, 1965    W. B. DAVIS    3,214,657
SOLID SELF-HEALING CAPACITOR
Filed Jan. 17, 1963

INVENTOR
WILLIAM BENJAMIN DAVIS

BY

ATTORNEY

# United States Patent Office 3,214,657
Patented Oct. 26, 1965

3,214,657
SOLID SELF-HEALING CAPACITOR
William Benjamin Davis, Montchanin, Del., assignor to E. I. du Pont de Nemours and Company, Wilmington, Del., a corporation of Delaware
Filed Jan. 17, 1963, Ser. No. 252,080
3 Claims. (Cl. 317—258)

This invention relates to electrical capacitors and more particularly to capacitors utilizing dielectric sheets metallized on both sides and having an outer coating of a heat sealable plastic material.

A capacitor which is light in weight, durable and compact has a definite place in the capacitor industry. Presently, film-foil and paper foil units impregnated with a liquid dielectric are being used but are bulky in size.

Bulky capacitors have been partially overcome by using a two side metallized polyethylene terephthalate film and a sheet of plain uncoated polyethylene terephthalate as the dielectric for making capacitors. However, two problems that are still present in a capacitor of this construction are air entrapment and capacitor size. In the finished convolutely wound unit, air is entrapped between the layers of the dielectric and metallized film allowing differential movement of the elements, with resulting undesirable capacitance changes.

It is, therefore, an object of this invention to provide a capacitor which is compact, light in weight and self-healing. These and other objects will appear hereinafter.

The present invention overcomes the problems of conventional capacitors by placing a very thin coating of a heat sealable plastic material possessing good electrical properties on one or both sides of a base of two side metallized polyethylene terephthalate film. This structure is then convolutely wound into a capacitor and heat set to form a solid unit.

For a more clear understanding of this invention and its advantages, reference is made to the accompanying drawing, wherein.

Figure 2:
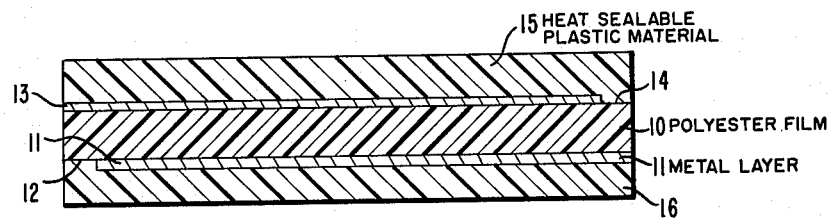
FIGURE 2 is a cross-sectional illustration of the arrangement of separate elements of this invention.

As shown in FIGURE 2, the preferred laminate construction illustrates the basic combination of polyethylene terephthalate film which has been metallized on both sides and coated on both sides with a heat sealable dielectric.

The base sheet of polyethylene terephthalate film 10 has a metal coating 11 on one surface of the film recessed at one edge to provide an uncoated margin 12 to prevent corona along the edge of the film. The reverse arrangement is used on the opposite surface of the film so that the metal coating 13 provides an uncoated margin 14 along the opposite edge of the film. Both sides of the metallized film have complete coatings 15 and 16 of a heat sealable plastic material.

Figure 1:
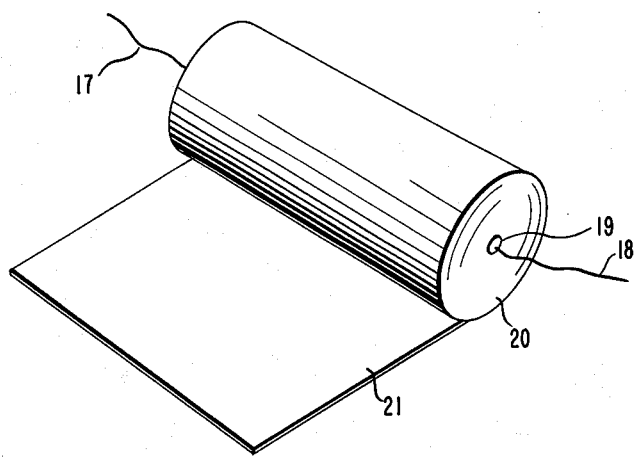
FIGURE 1 illustrates the separate elements wound in a form to be used as a capacitor.

To construct the capacitor shown in FIGURE 1, the laminate 21, as shown in FIGURE 2, is convolutely wound on its transverse axis in a manner such that the heat sealable coatings on the opposite sides of the laminate are in direct contact. Outside electrical connections 17 and 18 are then attached through a solder connection 19 to a metallized end 20 formed by metal spraying the two open ends of the convolutely wound unit. If there is only one heat sealable coating, it will be in direct contact with the opposite metal layer.

In order to prevent short circuit conditions around the edges of the film it is essential to have a margin free of the metal coating on the base film wherein the opposite surfaces are at different potential. This is accomplished by masking the film during the metallizing operation, which coating preferably is deposited by evaporation in a vacuum. This margin can also be formed by etching or buffing a fully metalilzed film to remove undesired metal.

The preferred base film is biaxially oriented, heat-set polyethylene terephthalate film which can be prepared by the process of Scarlett USP 2,823,421. However, other polyester or copolyester films or dielectric sheets with a dielectric constant over 2 are useful and include such films as the polycarbonates. However, when using a polycarbonate film it is necessary to use the lower melting polystyrene coating so that the metallized polycarbonate sheet will not be damaged when the unit is heat set. It is preferred that the dielectric sheets have a thickness of 0.15 to 0.5 mils in thickness.

Aluminum is generally used for metallizing the film but other materials such as copper, zinc, silver, or any pure or alloyed electrically conductive metal that can be made to adhere to the surface of the film can be employed. It is preferred that the metal layers be from 0.0005 to 0.003 mils in thickness.

The heat sealable plastic material coating preferably consists of a polystyrene or a polycarbonate. Any heat sealable material coating can be used so long as it has a dielectric constant above 2 and has a melting point under that of the dielectric sheet. Other useful heat sealable plastic materials include polyester resins or high temperature waxes such as natural or synthetic waxes having a melting point over 75° C. Carnauba wax, a vegetable wax having a melting point between 86–89° C., or Montan wax, a semi-mineral wax having a melting point between 83–89° C., would be useful natural waxes for this applicaion. A glycol based synthetic wax like Acrawax type C having a melting point between 140–142° C. can also be used. The coatings can be applied to the metallized film by any conventional techniques such as wire drawing or gravure rolling. The coatings should have a thickness of 0.1 to 0.5 mils in thickness and most preferably a thickness of 0.1 to 0.15 mils.

The preferred polycarbonate resin is derived from aromatic dihydroxy compounds and carbonic acid. It can also be termed a polyaryl carbonate polymer. The polycarbonates can be prepared either by the phosgenation of a dihydroxy aromatic compound or by an ester exchange between a carbonate diester and a dihydroxy aromatic compound. A preferred polycarbonate resin is the reaction product of phosgene and bisphenol A.

The invention can be further understood by referring to the following examples:

*Example 1*

Several capacitors are constructed with 2 inch wide, 0.25 mil polyethylene terephthalate film two side coated with aluminum of about 0.001 mil thickness with a resistivity of 1 ohm per square. The metal coatings are applied to a 1¾ inch strip on each surface by masking a ¼ inch margin on one edge of the film during deposition of a metal in a vacuum chamber. The dielectric coating is then placed on both sides of the metallized film.

The coating is prepared by dissolving dry granular polystyrene in methyl ethyl ketone to obtain a 15–20% solids solution. The coating is then put on the metallized film with a standard laminating machine using a No. 84 gravure roll and coating speeds of 25–30 feet/minute and a dryer temperature of 220° F. A coating thickness of 0.10–0.15 mils is obtained with this method.

Capacitors are convolutely wound and external electrical connections are placed in contact with the metallized coating. The units are heat set at 90° C. for 120 minutes to allow the dielectric coating to flow and fuse into a solid capacitor.

The electrical life of these units is checked by applying a constant direct current voltage of 300 volts which is continuously measured by an electrostatic voltmeter. During the test, the capacitors are kept at a constant 75° C. The capacity of the units is 1 microfarad and under these conditions the units remain operable for 500 hours.

*Example II*

Several capacitors are constructed with the same size and type metallized polyethylene terephthalate film as in Example I. The coating on the metallized film is applied in the exact same manner with all operating conditions being the same as in Example I, but "Lexan" polycarbonate resin manufactured by General Electric Corporation, which is the reaction product of phosgene and bisphenol A, is substituted for the polystyrene of Example I as the coating material. The same solvent and concentration of polycarbonate resin in solution is employed as in Example I and a coating thickness of 0.1–0.15 mils is obtained.

Capacitors are convolutely wound and external connections are placed in contact with the metallized coating.

The units are then heat set at 170° C. for 180 minutes which allows the dielectric coating to flow and fuse into a solid capacitor.

The electrical life of these units is checked by applying a constant direct current voltage of 300 volts which is continuously measured by an electrostatic voltmeter. During the test, the capacitors are kept at a constant 85° C. The capacity of these units is measured and found to be 1 microfarad. Under these conditions the units remain operable for 500 hours.

The advantage of the capacitor construction of the present invention is that it provides a compact, light weight unit which can be constructed at relatively low cost.

Thin films of polystyrene and polycarbonate can be obtained for use as a dielectric but they are very brittle, making them difficult to fabricate into capacitors, and very costly whereas the polymer itself is of relatively low cost and can be applied easily as a coating to a support. In this construction the polyethylene terephthalate film provides the support for the polystyrene and polycarbonate resin.

The capacitor of this invention also exhibits a self-healing property. In the conventional foil/paper or film/foil capacitors when a portion of the metal is perforated or torn, or when an insulation fault develops, a short circuit results making the capacitor useless. When such a fault develops with the capacitor of this invention, the continued application of voltage causes the metal surrounding the flaw to burn and at the same instant cause the heat sealable dielectric and the polyethylene terephthalate base to melt and cover the exposed edges with molten polymer thereby eliminating the short circuit and restoring the capacitor to substantially its original usefulness. This unique property is considerably reduced if the thickness of the metal is permitted to exceed .05 mil.

A capacitor made with a solid impregnate has many advantages over the currently used oil filled capacitor. The problem of leakage which is present in oil filled units is eliminated. A solid unit is less susceptible to damage than a liquid filled capacitor. The solid dielectric, being a hydrophobic material, provides a complete moisture barrier while fluid filled units tend to absorb moisture from the atmosphere which changes the capacitance of the unit. Also, it has been found that external pressure applied to a liquidfilled unit changes the effect of the dielectric and will change the capacitance whereas in the solid unit no deformation due to pressure can occur to change capacitance.

What is claimed is:

1. An electrical capacitor comprising: a convolutely wound, laminar structure comprising a base sheet of a polyester film having deposited on both sides thereof a thin layer of metal; means to couple said metal layers to an external electrical circuit and a coating on at least one metal layer of a heat sealable material having a melting point less than the melting point of said base sheet, said heat-sealable coating overlying and fused to the next adjacent convolute layer whereby a solid, self-healing structure free from air entrapment if formed.

2. An electrical capacitor comprising: a convolutely wound, laminar structure comprising a base sheet of polyethylene terephthalate film having deposited on both sides thereof a thin layer of metal; means to couple said metal layers to an external electrical circuit and a coating on at least one metal layer of a heat sealable material selected from the group consisting of polystyrene and a polycarbonate, said heat-sealable coating overlying and fused to the next adjacent convolute layer whereby a solid, self-healing structure free from air entrapment is formed.

3. The capacitor of claim 2 wherein the heat sealable coating is on both metal layers and is from 0.1 to 0.5 mils in thickness.

References Cited by the Examiner

UNITED STATES PATENTS

| | | | |
|---|---|---|---|
| 2,728,036 | 12/55 | Steiner et al. | 317—258 |
| 2,816,273 | 12/57 | Peck | 317—260 |
| 3,048,750 | 8/62 | Netherwood | 317—260 |

FOREIGN PATENTS 828,434  2/60  Great Britain.

OTHER REFERENCES

Birks, J. B.: Modern Dielectric Materials, London Heywood and Co. 1960 Q C, 585 B5 C.2 page 121 relied on.

McLean, D. A. et al.: "Miniature Lacquer Film Capacitors" in I.R.E. Proceedings, pp. 1799–1805, Dec. 1954 TK5700 I.7.

Wehe, H. G.: "Miniature Metallized Lacquer Film Capacitors." In Bell Laboratories Record pp. 441–444 Dec. 1955.

E. JAMES SAX, *Primary Examiner.*

JOHN F. BURNS, *Examiner.*